United States Patent [19]

Epstein

[11] 4,279,552

[45] Jul. 21, 1981

[54] PORTABLE ELECTRIC DRILL GUIDE

[76] Inventor: Ira J. Epstein, 4423 Flintstone Rd., Alexandria, Va. 22306

[21] Appl. No.: 91,192

[22] Filed: Nov. 5, 1979

Related U.S. Application Data

[63] Continuation-in-part of Ser. No. 915,018, Jun. 13, 1978.

[51] Int. Cl.$^3$ .......... B23B 45/14

[52] U.S. Cl. .......... 408/112

[58] Field of Search .......... 408/112, 111, 110, 113, 408/114, 115 R, 712

[56] References Cited

U.S. PATENT DOCUMENTS

| | | | |
|---|---|---|---|
| 2,837,939 | 6/1958 | Leitner | 408/110 |
| 3,779,663 | 12/1973 | Ruggles | 408/113 |

FOREIGN PATENT DOCUMENTS

| | | | |
|---|---|---|---|
| 121647 | 6/1946 | Australia | 408/112 |
| 2626945 | 12/1977 | Fed. Rep. of Germany | 408/112 |

*Primary Examiner*—Leonidas Vlachos
*Attorney, Agent, or Firm*—Allan R. Plumley

[57] ABSTRACT

A portable electric drill guide in the form of a plurality of legs attached to two rings, the upper of which is attachable to a drill head and the lower of which is adapted to be placed in contact with an object to be drilled at right angles to the drill bit.

1 Claim, 2 Drawing Figures

FIG. 1
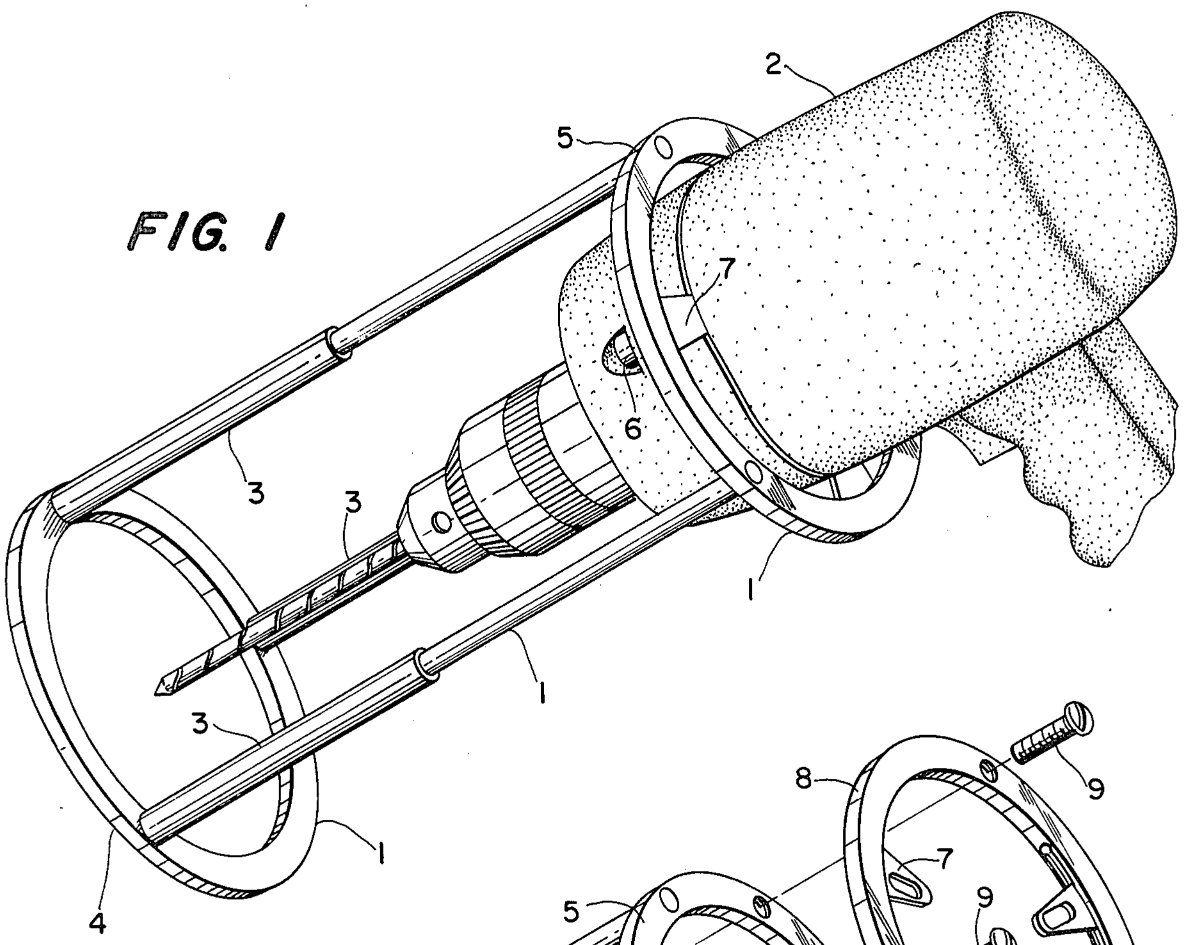
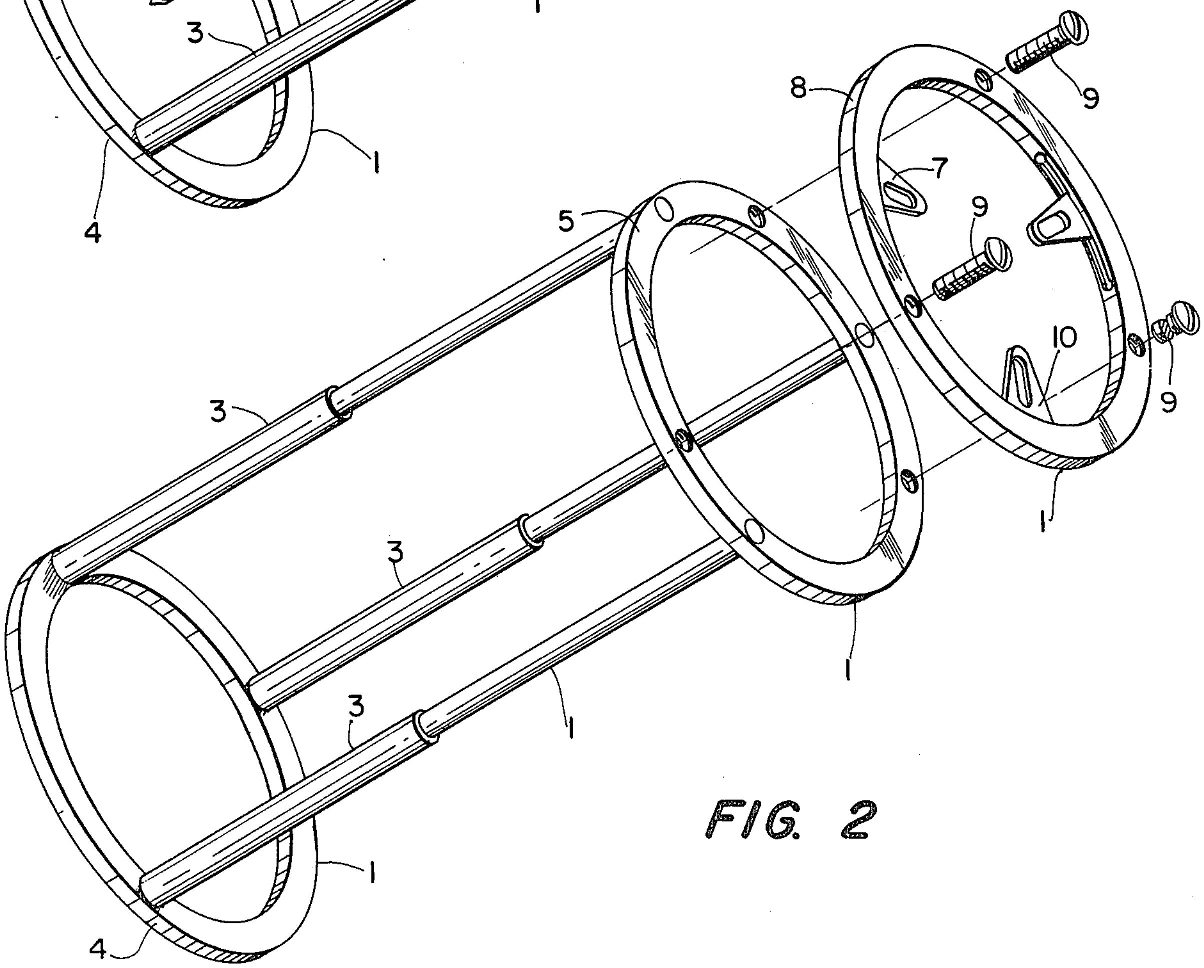
FIG. 2

PORTABLE ELECTRIC DRILL GUIDE

This is a continuation-in-part of application Ser. No. 915,018, filed June 13, 1978.

The present invention relates to drill guides and, more particularly, to a guide for portable electric drills.

It is difficult for the skilled mechanic, to say nothing of the unskilled operator, to hold a portable, electric drill at an exact right angle to the object which is to be drilled. As a result many instances occur where the drill will pierce the material being drilled and will exit at a spot appreciably removed from that which is desired. There have been many proposals of combinations of electric drills and guides for use in centering the drill bit so that the drilling occurs in a straight line at a desired angle, such as at a right angle to the material being drilled. These prior art attachments range all the way from the well known drill press to complex, heavy structures for drilling ceramics. These proposed combinations or guides have usually required special electric drills or have been bulky, heavy, expensive attachments which are not adapted for the commonly used, portable electric drills.

According to the present invention the disadvantages of the prior art are overcome and there is presented a novel, light weight, easily attached guide for portable electric drills which is easily portable and which is easily attached or removed from a portable electric drill. The guide of my invention is simple in construction, simple to use, low in manufacturing cost and needs no adjustment after attachment to the electric drill.

The guide of my invention comprises at least two circular rings made of heavy wire, tubing or flat sheet metal or plastic of about 2½ to 4 inches in diameter to which are attached a plurality of legs or supports, the lower ring constituting the bottom of the guide and the upper ring being attachable to the portable electric drill. The legs or supports may be spring loaded or move in an inner and outer rail configuration so as to be collapsible or telescopic to an extent sufficient to allow the drill and bit to move perpendicularly toward the object to be drilled. These legs can be constructed of strong metal or plastic tubing sections wherein one or more sections fit within and slide within each other.

The details of my invention are illustrated in the drawing in which in FIG. 1 the guide (1) of my invention is attached to a portable electric drill (2). As will be seen, the legs or supports (3) are permanently attached to the bottom ring (4) and also to the upper ring (5) of the guide (1). The upper ring (5) is attachable and detachable from the electric drill head (2) by means of the screws (6) already in place on the drill head (2) for the purpose of holding the two sections of the drill body together. These screws may pass through holes or slits (not shown) which may be provided in the upper ring (5). All that needs to be done in use of my invention is to remove the screws already an integral part of the drill, separate the two sections of the drill body, insert the upper ring lining up the holes in the drill body and the holes in the upper ring, and reinsert the screws.

Because there may be slight differences in the placement of the screws on different models of portable electric drills, I have found it advantageous to affix tabs (7) to the upper ring made of metal or strong plastic. Each tab contains a hole such that the spacing of each tab with its hole corresponds perfectly to the screw holes on specific models of available drills. Alternatively, one or all of these tabs can be slideably affixed to the upper ring (see FIG. 2) in the same manner as tabs are slideably affixed to curtain rods, i.e. with one end of the tab sliding in the slit of the rod and with the other end of the tab being outside the rod adapted to hold a curtain hook. In this method, the tabs can contain elongated holes to allow fastening of the upper ring to the drill head as described above.

An alternative method of attaching the drill guide of my invention to a portable electric drill illustrated in FIG. 2. In this method a third ring (8) may be attached to the drill on a more or less permanent basis such as has been previously described in connection with the attachment of the top ring to the drill. Then the top ring (5), of this method, may be easily attached to and detached from this third ring (8) by a plurality of screws (9) and wing nuts (not shown) passing through both the top ring (5) and the third ring (8). This method has the advantage of not requiring separation of the two sections of the drill body every time my guide (1) is to be used.

The use of the guide of my invention makes possible and assures the centering and drilling of a flat surface object at right angles to or exactly perpendicular to the flat face of the object. The guide can be easily attached or detached from a portable electric drill. Actually all that is needed for this purpose is a common screwdriver. Because of the collapsible structure of the legs, the guide of my invention makes possible the use of a wide variety of drill lengths.

Another advantage of the guide of my invention lies in the fact that my guide may be employed in any position, i.e. horizontal, vertical and in between as well as in positions and locations where a drill press cannot be used.

Although the dimensions may vary, I have found that legs of 4–6 inches in length and collapsible or telescopically adjustable to a range of about 3 to 6 inches in length are adequate for the majority of drilling operations. If greater depth of drilling is necessary, the guide may be removed after drilling a hole perpendicularly and then, the exact perpendicularity having been established, the further drilling can be accomplished with a drill of the desired greater length.

As mentioned, the legs may be made of tubing of various sizes and materials. One tube being slideable inside another, or made of several tubes in a telescopic manner similar to the common car antenna. The overall diameter of these legs should be kept relatively small such, for example, as ¼ to ⅜ inch. The diameters of the upper and lower rings may be the same or they may vary although for ease and convenience in manufacture of the guide I prefer to have them the same, i.e. in the range of 2½ to 4 inches in diameter. If they do vary in diameter, the upper ring should be in the range of 3–4 inches in diameter so that it will fit the drill head whereas the lower ring may be of a smaller diameter.

In actual practice I have found that my guide is easily attached to common ¼ to ½ inch portable electric drills such as those manufactured by and/or sold by Black & Decker, Sears Roebuck, Skil and the like. If larger portable electric drills are employed, with drill heads larger than the ¼ to ½ inch electric drills, then all that needs to be done is to increase the diameter of the upper ring of my guide to accomodate the larger electric drill.

Although my invention has been described with preferred embodiments as illustrations, it will be understood that various changes, modifications and substitutions may be made therein without departing from the spirit of the invention as defined by the claims which follow.

I claim:

1. A portable electric drill to which is attached a guide comprising a plurality of telescopically collapsible legs firmly attached to a lower ring adapted in use to be placed against an object to be drilled, said legs also being firmly attached to an upper ring adapted to be firmly attached to the drill head of a portable electric drill there being a plurality of tabs mounted on the upper ring of the guide each tab containing a hole adapted to correspond to the screws which hold the drill body together at least one of the plurality of tabs mounted on the upper ring being slideable in a slit in the upper ring.

* * * * *